(12) United States Patent
Takeuchi

(10) Patent No.: US 7,656,356 B2
(45) Date of Patent: Feb. 2, 2010

(54) NON-CONTACT COMMUNICATION ANTENNA UNIT AND MOBILE COMMUNICATION DEVICE USING THE SAME

(75) Inventor: Hirokazu Takeuchi, Gifu (JP)

(73) Assignee: Panasonic Corporation, Osaka (JP)

( * ) Notice: Subject to any disclaimer, the term of this patent is extended or adjusted under 35 U.S.C. 154(b) by 173 days.

(21) Appl. No.: 11/913,090

(22) PCT Filed: Jul. 26, 2006

(86) PCT No.: PCT/JP2006/314808

§ 371 (c)(1),
(2), (4) Date: Oct. 30, 2007

(87) PCT Pub. No.: WO2007/015406

PCT Pub. Date: Feb. 8, 2007

(65) Prior Publication Data

US 2009/0033567 A1  Feb. 5, 2009

(30) Foreign Application Priority Data

Aug. 2, 2005 (JP) .............................. 2005-223653

(51) Int. Cl.
*H01Q 1/24* (2006.01)
(52) U.S. Cl. .................. 343/702; 343/895; 343/787
(58) Field of Classification Search ............... 343/702, 343/700 MS, 895, 787, 788, 866, 741
See application file for complete search history.

(56) References Cited

U.S. PATENT DOCUMENTS

| | | | |
|---|---|---|---|
| 7,000,837 B2 * | 2/2006 | Akiho et al. | 235/451 |
| 7,457,637 B2 * | 11/2008 | Deguchi et al. | 455/562.1 |
| 7,561,114 B2 * | 7/2009 | Maezawa et al. | 343/841 |

2004/0140896 A1   7/2004  Ohkawa et al.

FOREIGN PATENT DOCUMENTS

EP     1 229 482 A2    8/2002

(Continued)

OTHER PUBLICATIONS

International Search Report Dated Oct. 10, 2006.

(Continued)

*Primary Examiner*—HoangAnh T Le
(74) *Attorney, Agent, or Firm*—Pearne & Gordon LLP

(57) ABSTRACT

A non-contact communication antenna unit capable of implementing a thickness reduction of a mobile communication device and also suppressing a reduction in a communication range characteristic of a non-contact communication antenna even when metal components such as circuit wirings, a circuit GND, a shielding case, etc. being arranged on the inside of the mobile communication device are arranged in close vicinity to the non-contact communication antenna is provided.

A non-contact communication antenna 9 and a magnetic sheet 11 arranged on one surface of a non-contact communication circuit board 8 respectively, and an non-contact communication electronic components 10 and a magnetic sheet 12 arranged on the other surface of the non-contact communication circuit board 8 respectively are provided, whereby the magnetic sheet 11 and the magnetic sheet 12 are arranged on the non-contact communication circuit board 8 such that the non-contact communication antenna 9 and the non-contact communication electronic component 10 are separated mutually.

6 Claims, 7 Drawing Sheets

FOREIGN PATENT DOCUMENTS

| | | |
|---|---|---|
| JP | 2000-076399 | 3/2000 |
| JP | 2002-208814 | 7/2002 |
| JP | 2004-038552 | 2/2004 |
| JP | 2004-153463 | 5/2004 |
| JP | 2004-341895 | 12/2004 |
| JP | 2004-364199 | 12/2004 |
| JP | 2004-364199 A | 12/2004 |
| JP | 2000-261230 A | 9/2009 |

OTHER PUBLICATIONS

European Search Report, Oct. 17, 2008.

* cited by examiner

NON-CONTACT COMMUNICATION ANTENNA UNIT AND MOBILE COMMUNICATION DEVICE USING THE SAME

TECHNICAL FIELD

The present invention relates to a non-contact communication antenna unit and a mobile communication device equipped with the same.

BACKGROUND ART

Nowadays the mobile communication device having a non-contact communication function is used as payment in a convenience store, etc., an admission ticket in an amusement park, a theater, etc., and others.

Since the mobile communication device has the non-contact communication function, the non-contact communication antenna unit is built in such mobile communication device. This built-in antenna unit can hold two-way communication with a reader/writer antenna built in an external non-contact communication device provided to the theater, etc.

In the mobile communication device in the related art, the non-contact communication function is carried out in such a way that, in order to avoid the influence of a shielding case, a metal parts, etc. arranged on the inside of the mobile communication device, a non-contact communication antenna covered with a soft magnetic radio absorptive material and electronic components acting for the non-contact communication antenna are arranged on different circuit boards and then are connected via a flexible base material (see Patent Literature 1, for example).

Patent Literature 1: JP-A-2004-153463

DISCLOSURE OF THE INVENTION

Problems that the Invention is to Solve

However, the mobile communication device in the related art has the configuration that the non-contact communication antenna and the electronic components acting for this non-contact communication antenna and other electronic components are arranged on different circuit boards and then are connected via the flexible base material. As a result, such a problem existed that the non-contact communication antenna, when built in the mobile communication device, occupies much space to result in an increase in thickness of the mobile communication device.

The present invention has been made to solve the problems in the related art, and it is an object of the present invention to provide a non-contact communication antenna unit capable of implementing a thickness reduction of a mobile communication device and also suppressing a reduction in a communication range performance, and a mobile communication device equipped with the same.

Means for Solving the Problems

A non-contact communication antenna unit of the present invention, includes a non-contact communication circuit board; a non-contact communication antenna arranged on one surface of the non-contact communication circuit board; a non-contact communication electronic component arranged on other surface of the non-contact communication circuit board; a first magnetic sheet arranged in a space portion of the non-contact communication antenna on one surface of the non-contact communication circuit board; and a second magnetic sheet arranged on a peripheral portion of the non-contact communication electronic component on other surface of the non-contact communication circuit board, whereby the first magnetic sheet and the second magnetic sheet are arranged to separate the non-contact communication antenna and the non-contact communication electronic component.

According to this configuration, a thickness reduction of a mobile communication device can be implemented and also a reduction in a communication range performance can be suppressed.

Also, in the non-contact communication antenna unit of the present invention, the non-contact communication circuit board has slits, and the first magnetic sheet and the second magnetic sheet are arranged to cover the slits and separate the non-contact communication antenna and the non-contact communication electronic component.

According to this configuration, a thickness reduction of a mobile communication device can be implemented and also a reduction in a communication range performance can be suppressed. Also, since the slits are used as a mark in positioning the magnetic sheet on the non-contact communication circuit board, a shear of the magnetic sheet in pasting can be prevented and also the non-contact communication antenna unit can be assembled easily.

Also, in the non-contact communication antenna unit of the present invention, the second magnetic sheet has a space portion on an inside, and at least one of a peripheral portion of the first magnetic sheet and a peripheral portion of the space portion of the second magnetic sheet is inserted into the slits, and the peripheral portion of the first magnetic sheet and the peripheral portion of the second magnetic sheet are adhered together.

According to this configuration, a thickness reduction of a mobile communication device can be implemented and also a reduction in a communication range performance can be suppressed. Also, since the magnetic sheets are adhered to the non-contact communication circuit board respectively, a displacement between the magnetic sheets can be prevented.

Also, a non-contact communication antenna unit of the present invention, includes a flexible circuit board having a space portion on an inside; a non-contact communication circuit board arranged to have a clearance in the space portion of the flexible circuit board; a non-contact communication antenna arranged on one surface of the flexible circuit board; a first magnetic sheet arranged on one surface of the non-contact communication circuit board; a non-contact communication electronic component arranged on other surface of the non-contact communication circuit board positioned on a same side as the other surface of the flexible circuit board; and a second magnetic sheet having a space portion on an inside and arranged on the other surface of the flexible circuit board; wherein at least one of a peripheral portion of the first magnetic sheet and a peripheral portion of the space portion of the second magnetic sheet is inserted into the clearance, and the peripheral portion of the first magnetic sheet and the peripheral portion of the second magnetic sheet are adhered together.

According to this configuration, a thickness reduction of a mobile communication device can be implemented and also a reduction in a communication range performance can be suppressed.

Also, a mobile communication device of the present invention having the non-contact communication antenna unit set forth above.

According to this configuration, a thickness reduction of the mobile communication device can be implemented, influences of metal components provided in the inside of the mobile communication device on the non-contact communication antenna can be suppressed, and also a reduction in a communication range performance can be suppressed.

Also, in the mobile communication device of the present invention, the mobile communication device is a cellular phone.

According to this configuration, a thickness reduction of the cellular phone can be implemented, influences of metal components provided in the inside of the cellular phone on the non-contact communication antenna can be suppressed, and also a reduction in a communication range performance can be suppressed.

Advantages of the Invention

The present invention can provide the non-contact communication antenna unit capable of implementing a thickness reduction of the mobile communication device and also suppressing a reduction in a communication range performance, and the mobile communication device equipped with the same.

Figure 1:
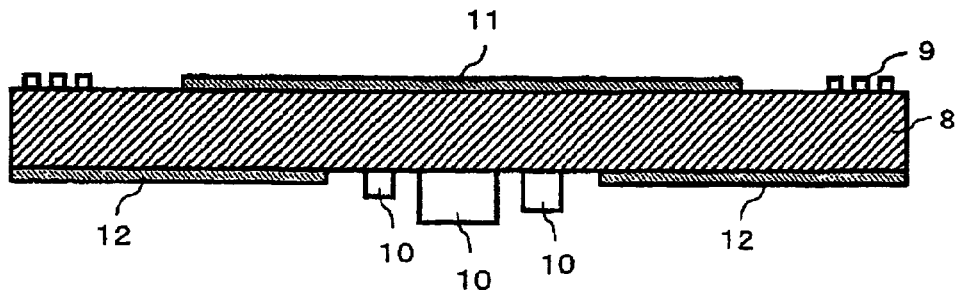
FIG. 1 is a partially notched sectional view of a non-contact communication antenna unit of Embodiment 1 of the present invention.

DESCRIPTION OF REFERENCE NUMERALS 1 cellular phone
2 upper case
3 lower case
4 cellular phone circuit board
5 non-contact communication antenna unit
6 external non-contact communication device
7 reader/writer antenna
8 non-contact communication circuit board
9 non-contact communication antenna
10 non-contact communication electronic component
11 magnetic sheet
12 magnetic sheet
13 slit
14 notch
15 space portion of the magnetic sheet 12
16 flexible printed circuit
17 clearance

BEST MODE FOR CARRYING OUT THE INVENTION

Embodiments of the present invention will be explained with reference to the drawings hereinafter.

EMBODIMENT 1

Figure 2:
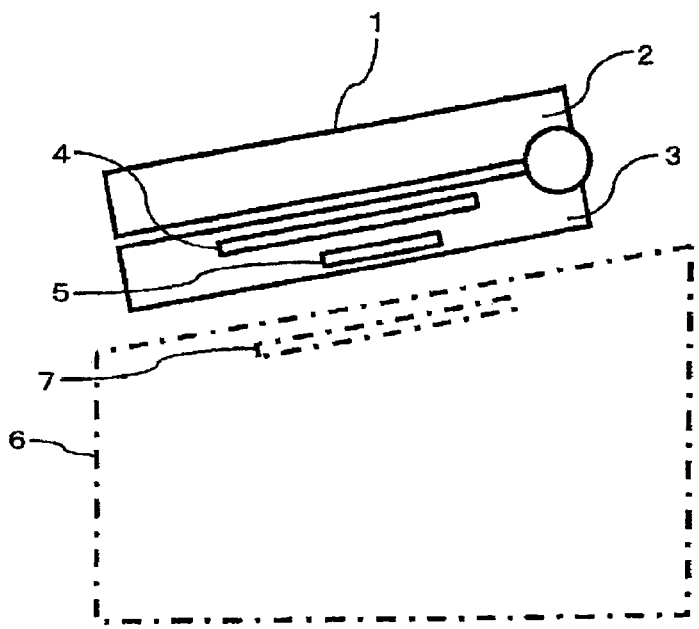
FIG. 2 is a view showing a using example of a cellular phone equipped with the non-contact communication antenna unit of Embodiment 1 of the present invention.

FIG. 2 is a view showing an example of a cellular phone equipped with a non-contact communication antenna unit of Embodiment 1 of the present invention.

In FIG. 2, a cellular phone 1 as the mobile communication device has an upper case 2 and a lower case 3, and also contains a cellular phone circuit board 4 on which electronic components and a metal shielding case necessary for an operation of the cellular phone are arranged, and a non-contact communication antenna unit 5 necessary for an operation of the non-contact communication in the lower case 3. Here, a folding cellular phone is explained by way of an example, but the present invention is not limited to this example. The present invention may also be applied to a straight type cellular phone or a cellular phone constructed such that the upper case or the lower case is turned, slid, or the like.

An external non-contact communication device 6 has a reader/writer antenna 7 that is used to hold the non-contact communication with the cellular phone 1 having a non-contact communication function.

The cellular phone 1, when held in close vicinity of the external non-contact communication device 6 as the communication destination, establishes the non-contact communication with this communication device 6 via a magnetic coupling between the non-contact communication antenna unit 5 and the reader/writer antenna 7.

Figure 3:
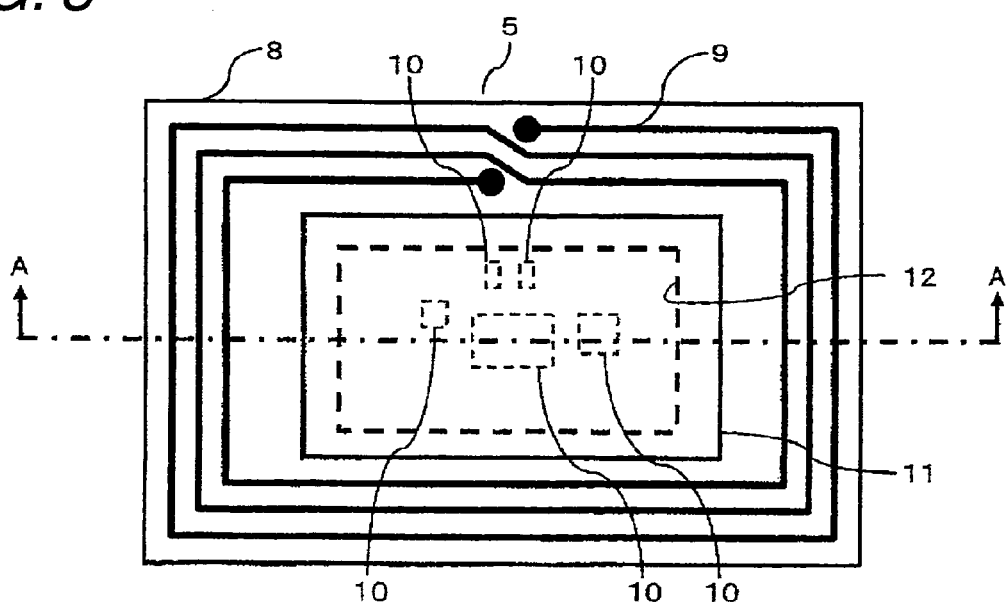
FIG. 3 is a plan view of the non-contact communication antenna unit of Embodiment 1 of the present invention.

FIG. 3 shows a plan view of the non-contact communication antenna unit 5 provided in the lower case 3 of the cellular phone 1.

In FIG. 3, the non-contact communication antenna unit 5 is constructed by a non-contact communication circuit board (referred to as a "circuit board" hereinafter) 8, a non-contact communication antenna (referred to as an "antenna" hereinafter) 9, non-contact communication electronic components (referred to as "electronic components" hereinafter) 10, a magnetic sheet 11, and a magnetic sheet 12.

The antenna 9 having a space portion on the inner side is arranged on a surface of the circuit board 8 on the side used to communicate with the reader-writer antenna 7 in FIG. 2. The magnetic sheet 11 is arranged in the space portion of the antenna 9. In contrast, the electronic components 10 are arranged in a center portion of another surface of the circuit board 8 on the opposite side to the antenna 9. The magnetic sheet 12 is arranged in a peripheral portion of the electronic components 10.

A loop antenna used commonly and shaped into a spiral shape is used as the antenna 9. Here, an area opened in an inner center portion of an antenna pattern of the loop antenna is mentioned as a space portion. Also, the case where the number of turns of the antenna 9 is set to three turns is illustrated, but the number of turns is not limited to this number. Any number of turns except three turns may of course be used.

The electronic components 10 consist of a non-contact communication LSI, a non-contact communication LSI oscillation device, resistors, capacitors, coils, etc., and are arranged in a center portion of the circuit board 8.

Here, by way of example, assume that the magnetic sheets 11, 12 are formed of magnetic powders that can get the optimum communication range performance in a 13.56 MHz band used as a communication frequency band for the proximity non-contact communication.

FIG. 1 is a partially notched enlarged sectional view of the non-contact communication antenna unit, taken along an A-A line in FIG. 3.

As shown in FIG. 1, the magnetic sheet 11 and the magnetic sheet 12 are arranged such that these sheets overlap partially with each other to put the circuit board 8 between them. Therefore, these magnetic sheets can separate the antenna 9 and the electronic components 10. As a result, the influences of metal components such as the electronic components 10, electronic circuit wirings (not shown), an electronic circuit GND (not shown), etc., which are arranged on both surfaces of the circuit board 8 on the antenna 9 side and the opposite side, on the antenna 9 can be prevented, and thus a communication range of the antenna 9 can be ensured. Also, because the magnetic flux is converged by using the magnetic sheet 12, an attenuation of a magnetic field strength on the inner peripheral portion of the antenna 9 caused by the eddy current, which is generated in the metal shielding case on the cellular phone circuit board 4 arranged in the lower case 3, etc., can be prevented, and thus a communication range of the antenna 9 can be ensured.

As described above, according to the mobile communication device equipped with the non-contact communication antenna unit of Embodiment 1 of the present invention, the antenna 9 and the electronic components 10 are arranged on the opposite side of the same circuit board 8 respectively, whereby the antenna 9 and the electronic components 10 are separated by the magnetic sheet 11 and the magnetic sheet 12. Therefore, a thickness reduction of the mobile communication device can be implemented and also a reduction in the communication range performance can be suppressed.

EMBODIMENT 2

In Embodiment 2 of the present invention, the case where slits are provided to the non-contact communication circuit board constituting the non-contact communication antenna unit will be explained hereunder by way of example.

Figure 4:
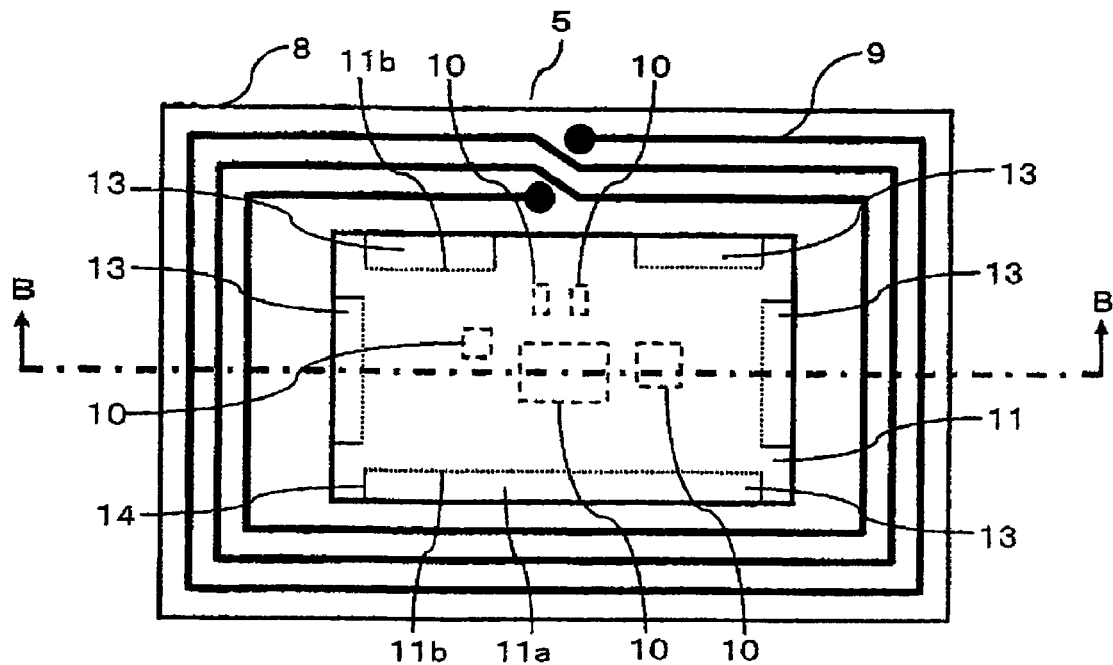
FIG. 4 is a plan view of a non-contact communication antenna unit of Embodiment 2 of the present invention.

FIG. 4 shows a plan view of the non-contact communication antenna unit 5 of Embodiment 2 of the present invention. In respective elements of the non-contact communication antenna unit 5 of Embodiment 2, the same reference symbols are affixed to the same elements as those of the non-contact communication antenna unit 5 of Embodiment 1 and their explanation will be omitted herein.

As shown in FIG. 4, a plurality of slits 13 are provided in the constituting the non-contact communication antenna unit 5. Respective slits 13 are arranged at locations that are positioned on the inner side of the antenna 9 and around the electronic components 10.

The magnetic sheet 11 has a size that covers respective slits 13 provided in the circuit board 8. A plurality of folding portions 11a formed by providing a notch 14 are provided to the peripheral portion of the magnetic sheet 11 (see FIG. 5). Then, the folding portions 11a of the magnetic sheet 11 are folded down along a folding line 11b and then inserted into the slits 13 respectively.

Also, although not shown in FIG. 4, the magnetic sheet 12 has a space portion 15 on the inside and covers all slits 13 provided in the circuit board 8, and its outer periphery has the same size as the circuit board 8. A plurality of folding portions 12a formed by providing the notch 14 are provided to the inner peripheral portion of the space portion 15 (see FIG. 6). Also, the folding portions 12a of the magnetic sheet 12 are folded down along a folding line 12b and then inserted into the slits 13 respectively.

Figure 5:
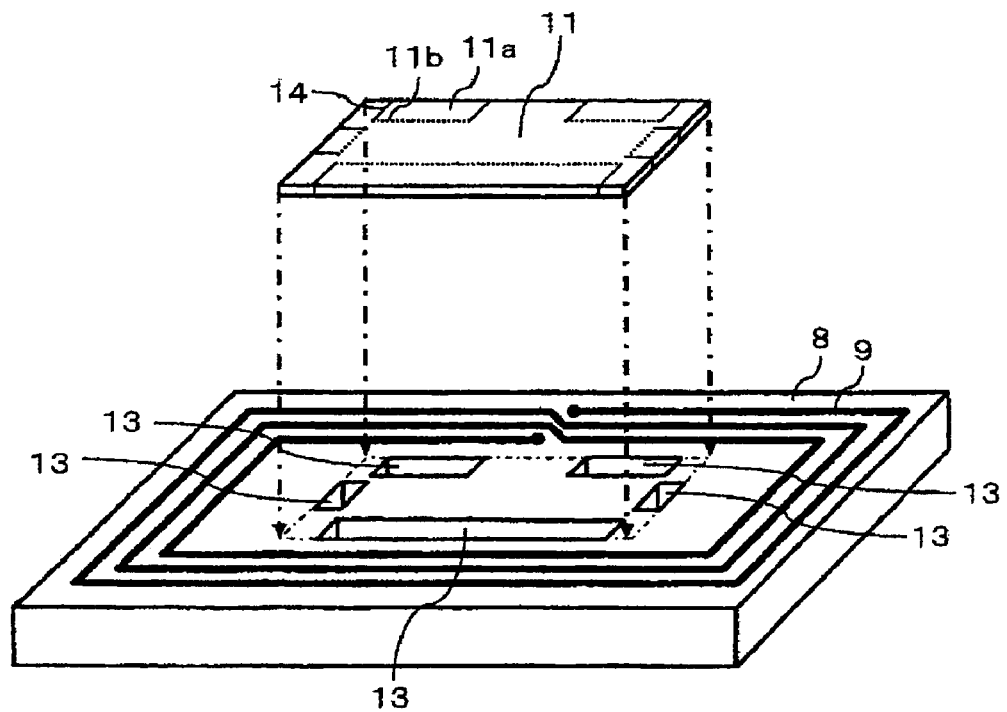
FIG. 5 is an exploded perspective view of the non-contact communication antenna unit of Embodiment 2 of the present invention when viewed from the antenna side.
Figure 6:
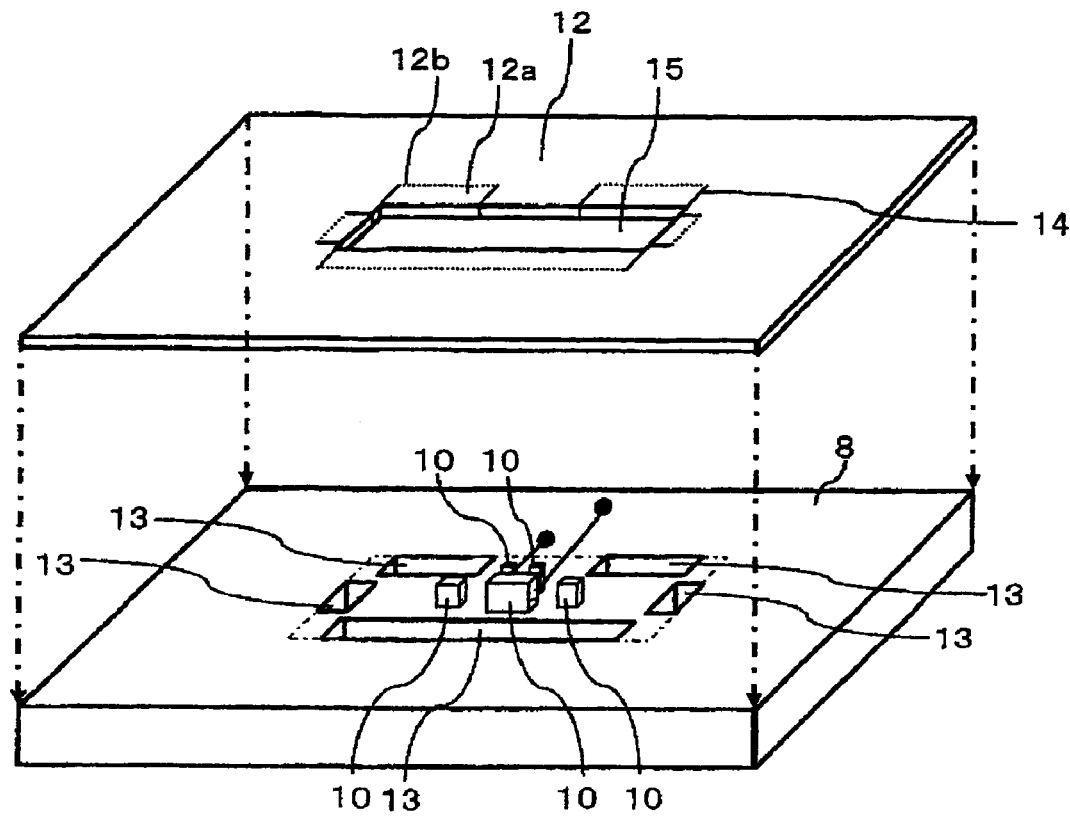
FIG. 6 is an exploded perspective view of the non-contact communication antenna unit of Embodiment 2 of the present invention when viewed from the opposite side to the antenna side.

FIG. 5 is an exploded perspective view showing an arrangement relationship between the circuit board 8 and the magnetic sheet 11. FIG. 6 is an exploded perspective view showing an arrangement relationship between the circuit board 8 and the magnetic sheet 12.

In FIG. 5, the folding portions 11a are inserted into the slits 13 upon positioning the magnetic sheet 11. Therefore, the magnetic sheet 11 can be arranged precisely by preventing a shear in pasting from the circuit board 8.

In FIG. 6, the space portion 15 is provided in the inner side of the magnetic sheet 12. Therefore, the magnetic sheet 12 can be arranged not to overlap with the electronic components 10 arranged on the circuit board 8.

Figure 7:
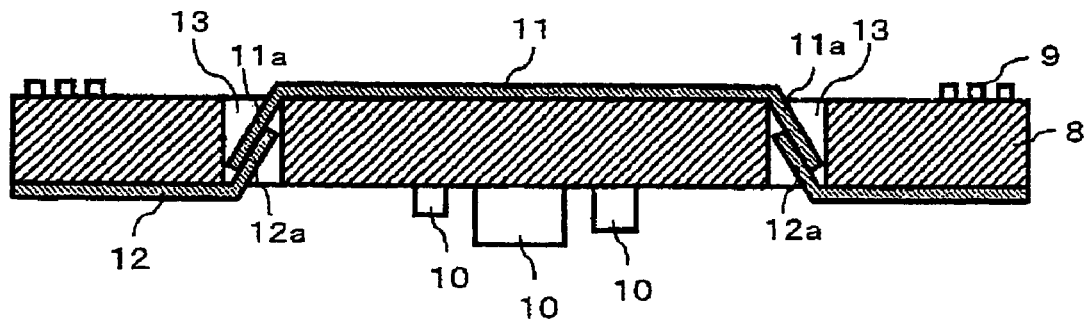
FIG. 7 is a partially notched sectional view of the non-contact communication antenna unit of Embodiment 2 of the present invention.

FIG. 7 shows a partially notched enlarged sectional view of the non-contact communication antenna unit, taken along a B-B line in FIG. 4.

As shown in FIG. 7, the folding portion 11a of the magnetic sheet 11 and the folding portion 12a of the magnetic sheet 12 are inserted into the slit 13 to overlap with each other. Then, overlapped portions of the magnetic sheets 11, 12 are stuck together with the adhesive (not shown), or the like.

Figure 8:
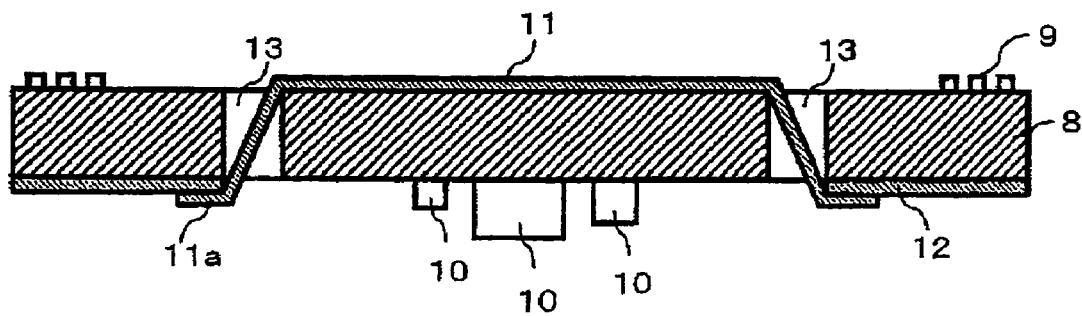
FIG. 8 is a partially notched sectional view of a variation of the non-contact communication antenna unit of Embodiment 2 of the present invention.
Figure 9:
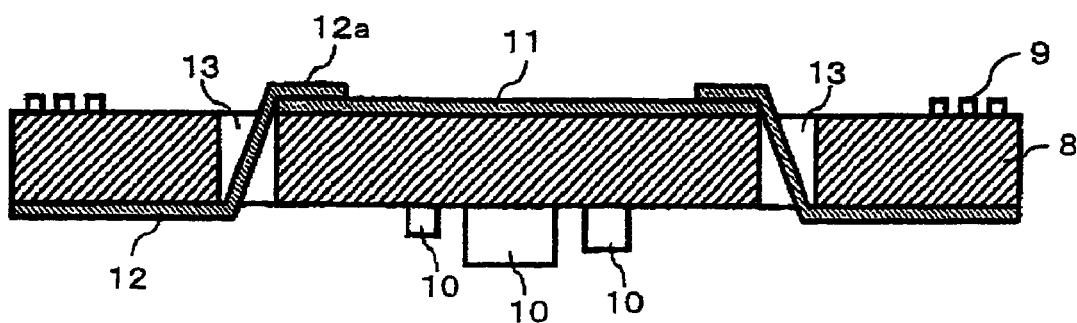
FIG. 9 is a partially notched sectional view of another variation of the non-contact communication antenna unit of Embodiment 2 of the present invention.

In above Embodiment 2, the case where the folding portions 11a, 12a of the magnetic sheets 11, 12 are overlap mutually in the slit 13 and adhered together is explained as an example. But the present invention is not limited to this example. More particularly, as shown in FIG. 8, the folding portion 11a of the magnetic sheet 11 may be inserted into the slit 13 to pass through it, and then the folding portion 11a of the magnetic sheet 11 and the peripheral portion of the magnetic sheet 12 around the space portion may be adhered together on the outside of the slit 13. Also, as shown in FIG. 9, the folding portion 12a of the magnetic sheet 12 may be inserted into the slit 13 to pass through it, and then the folding portion 12a of the magnetic sheet 12 and the peripheral portion of the magnetic sheet 11 may be adhered together on the outside of the slit 13.

Figure 10:
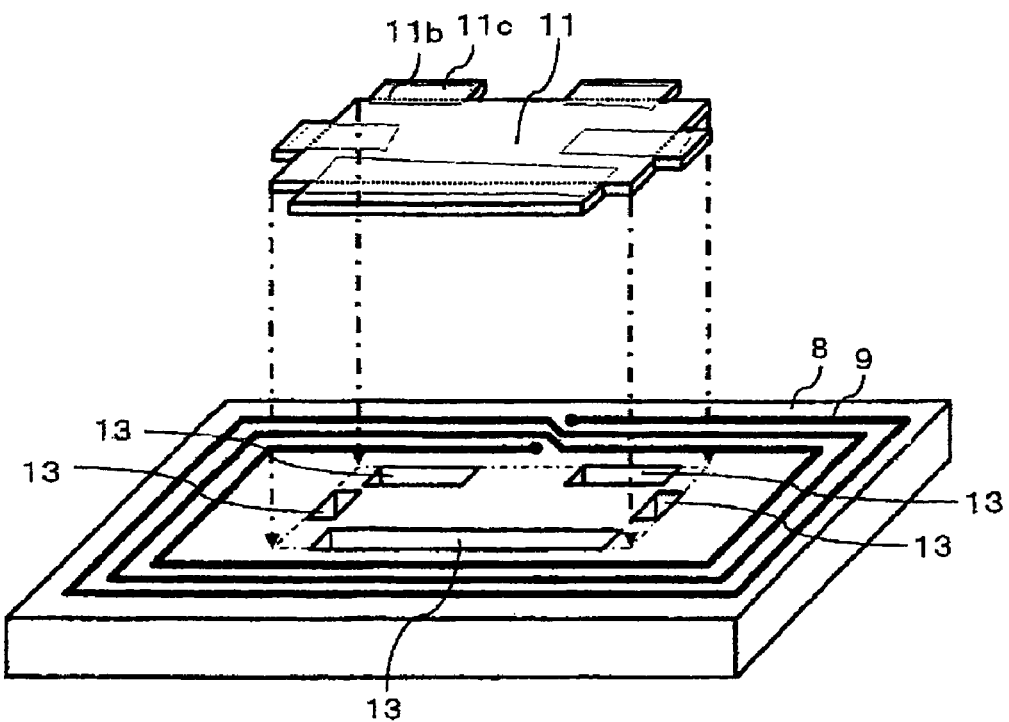
FIG. 10 is an exploded perspective view of the variation of the non-contact communication antenna unit of Embodiment 2 of the present invention when viewed from the antenna side.
Figure 11:
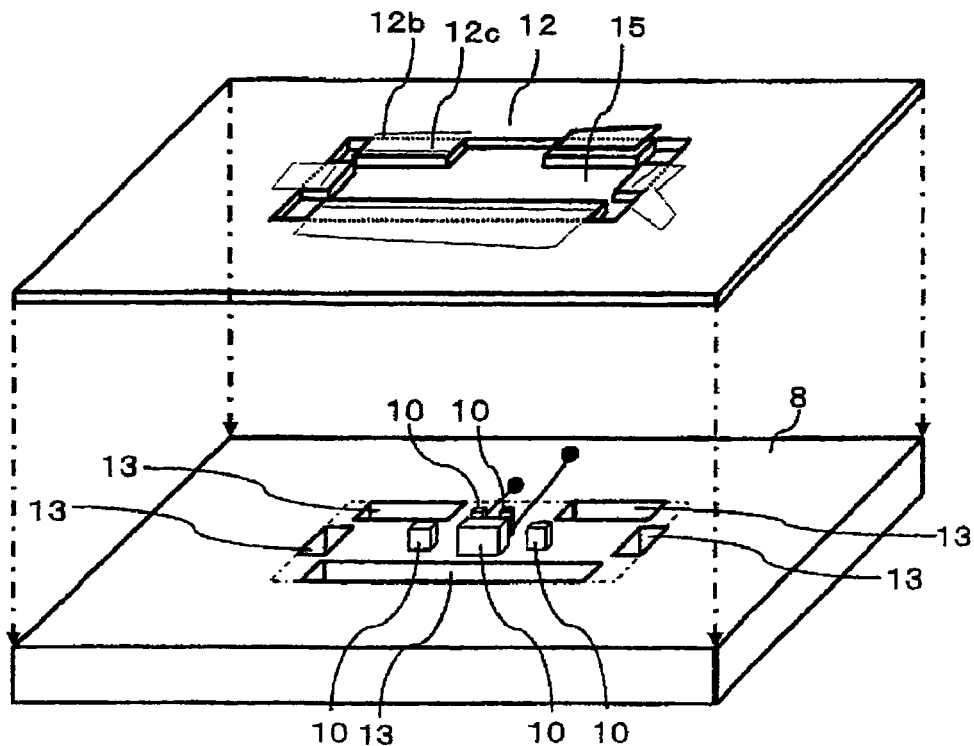
FIG. 11 is an exploded perspective view of the variation of the non-contact communication antenna unit of Embodiment 2 of the present invention when viewed from the opposite side to the antenna side.

Also, in above Embodiment 2, the case where the folding portions 11a, 12a are formed by providing the notches 14 to the magnetic sheets 11, 12 is explained as an example. But the present invention is not limited to this example. More particularly, as shown in FIG. 10, projected portions 11c may be provided to the peripheral portion of the magnetic sheet 11 without notch, and then the projected portions 11c may be inserted into the slits 13. Also, as shown in FIG. 11, projected portions 12c may be provided to the peripheral portion of the magnetic sheet 12 around the space portion 15, and then the projected portions 12c may be inserted into the slits 13. Because the notches shown in FIG. 5 and FIG. 6 are provided, the magnetic sheets a part of which is to be inserted into the slits can be easily formed. Also, because the projected portions shown in FIG. 10 and FIG. 11 are provided, the magnetic sheets can be inserted easily into the slits and thus the non-contact communication antenna unit can be assembled easily.

As shown in FIG. 7, since the magnetic sheet 11 and the magnetic sheet 12 are arranged by using the slits 13 to overlap with each other, the antenna 9 and the electronic components 10 can be separated mutually. As a result, the influences of metal components such as the electronic components 10, electronic circuit wirings, an electronic circuit GND, etc., which are arranged on both surfaces of the circuit board 8 on the antenna 9 side and the opposite side, on the antenna 9 can be prevented, and thus a communication range of the antenna 9 can be ensured. Also, an attenuation of a magnetic field strength on the inner peripheral portion of the antenna 9 caused by the eddy current, which is generated in the metal shielding case on the cellular phone circuit board 4 arranged in the lower case 3, etc., can be prevented by using the magnetic sheet 12, and thus a communication range of the antenna 9 can be ensured.

As described above, according to the mobile communication device equipped with the non-contact communication antenna unit of Embodiment 2 of the present invention, the antenna 9 and the electronic components 10 are arranged on the opposite side of the same circuit board 8 respectively, whereby the antenna 9 and the electronic components 10 are separated by the magnetic sheet 11 and the magnetic sheet 12 by using the slits 13. Therefore, a thickness reduction of the mobile communication device can be implemented and also a reduction in a communication range performance can be suppressed.

EMBODIMENT 3

In Embodiment 3 of the present invention, the case where the non-contact communication antenna unit is arranged on the flexible printed circuit will be explained hereunder by way of example.

Figure 12:
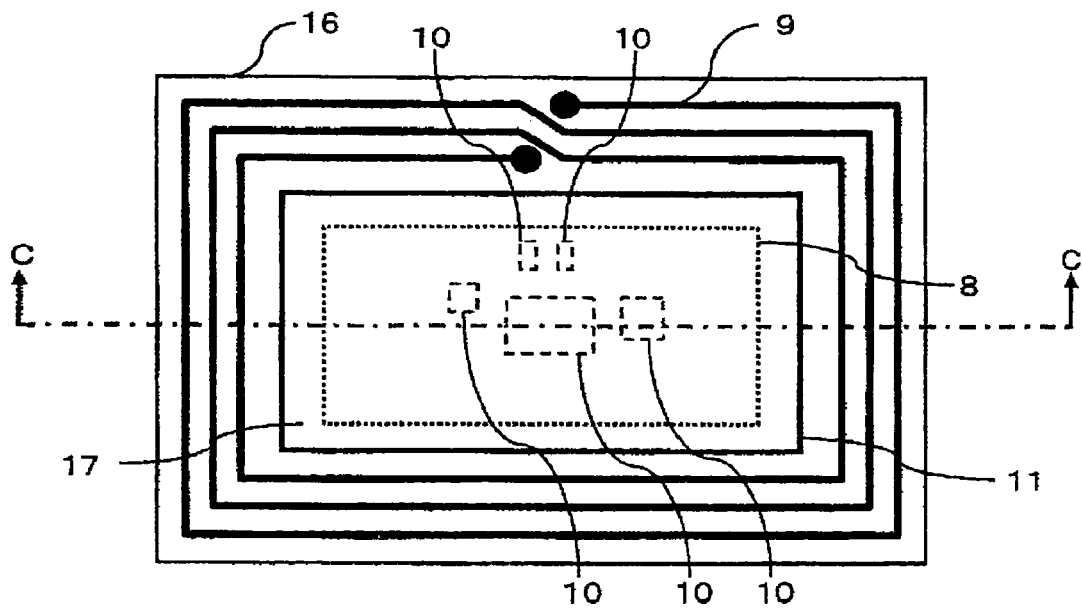
FIG. 12 is a plan view of a non-contact communication antenna unit of Embodiment 3 of the present invention.

FIG. 12 A plan view of a non-contact communication antenna unit of Embodiment 3 of the present invention. In respective elements of the non-contact communication antenna unit 5 of Embodiment 3, the same reference symbols are affixed to the same elements as those of the non-contact communication antenna unit 5 of Embodiment 1 and their explanation will be omitted herein.

As shown in FIG. 12, in Embodiment 3, the antenna 9 is arranged on a surface of a flexible printed circuit (abbreviated as "FPC" hereinafter) 16 that has a space portion in its inner side. The circuit board 8 is arranged in the space portion of the FPC 16 by providing a clearance 17 from the FPC 16, and the antenna 9 on the FPC 16 and the electronic components 10 on the circuit board 8 are connected by the soldering, or the like. Also, the electronic components 10 are arranged on the surface of the circuit board 8 opposite to the side of the FPC 16 on which the antenna 9 is arranged.

Figure 13:
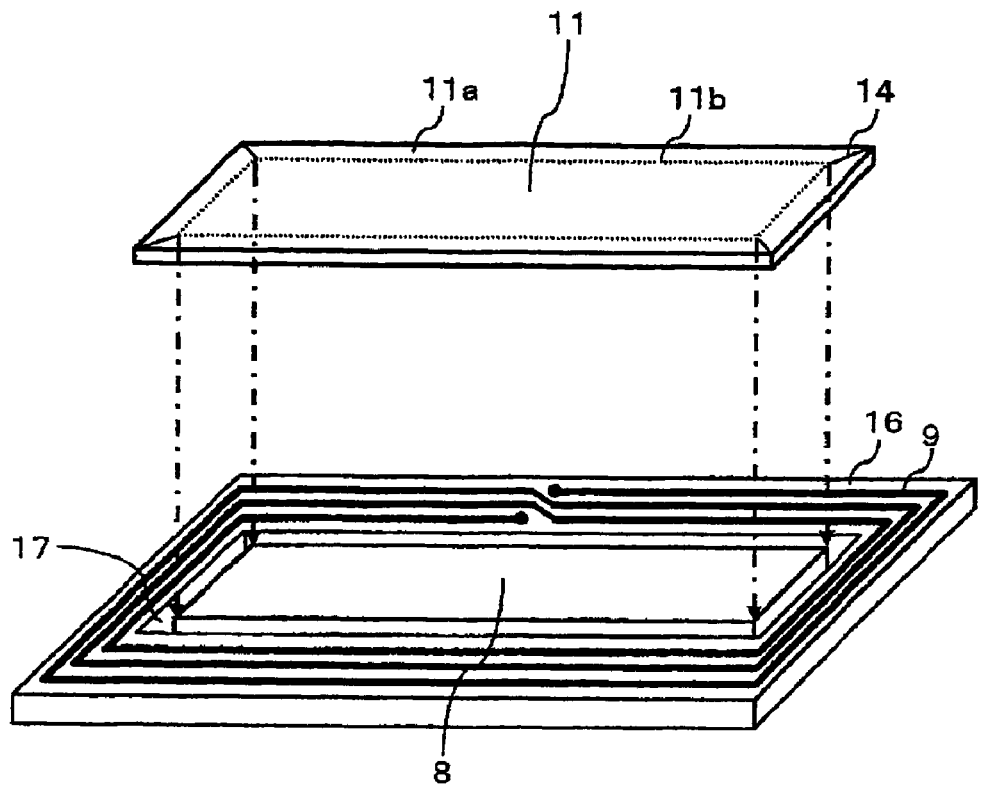
FIG. 13 is an exploded perspective view of the non-contact communication antenna unit of Embodiment 3 of the present invention when viewed from the antenna side.

The magnetic sheet 11 has a size that covers the clearance 17 between the circuit board 8 and the FPC 16, and the folding portions 11a formed by using the notch 14 are provided to the peripheral portion (see FIG. 13). Then, the folding portions 11a of the magnetic sheet 11 are folded down along the folding line 1ib and then inserted into the clearance 17.

Also, although not shown in FIG. 12, the magnetic sheet 12 has the space portion 15 on the inside and covers fully the clearance 17 between the circuit board 8 and the FPC 16, and its outer periphery has the same size as the FPC 16. A plurality of folding portions 12a are provided to the inner peripheral portion of the space portion 15 (see FIG. 14). Also, the folding portions 12a of the magnetic sheet 12 are inserted into the clearance 17 between the circuit board 8 and the FPC 16.

Figure 14:
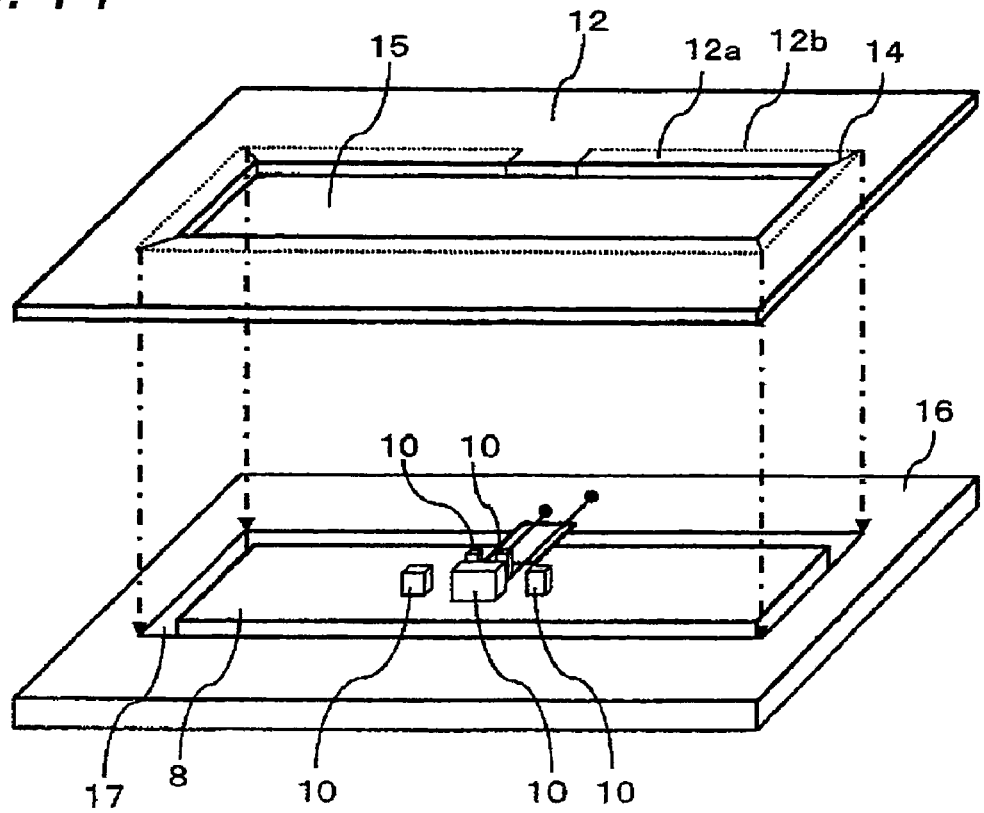
FIG. 14 is an exploded perspective view of the non-contact communication antenna unit of Embodiment 3 of the present invention when viewed from the opposite side to the antenna side.

FIG. 13 is an exploded perspective view showing an arrangement relationship between the magnetic sheet 11 and the circuit board 8 and the FPC 16. FIG. 14 is an exploded perspective view showing an arrangement relationship between the magnetic sheet 12 and the circuit board 8 and the FPC 16.

In FIG. 13, the folding portions 11a are inserted into the clearance 17 upon positioning the magnetic sheet 11. Therefore, the magnetic sheet 11 can be arranged precisely by preventing a shear in pasting from the circuit board 8.

In FIG. 14, the space portion 15 is provided in the inner side of the magnetic sheet 12. Therefore, the magnetic sheet 12 can be arranged not to overlap with the electronic components 10 arranged on the circuit board 8.

Figure 15:
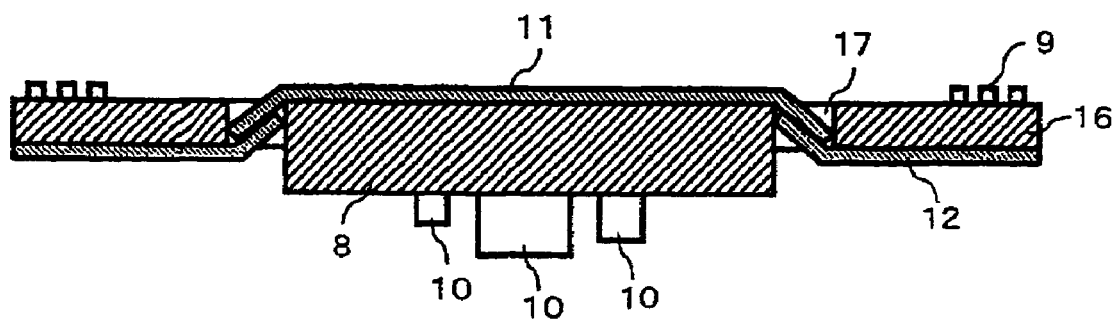
FIG. 15 is a partially notched sectional view of the non-contact communication antenna unit of Embodiment 3 of the present invention.

FIG. 15 is a partially notched enlarged sectional view of the non-contact communication antenna unit, taken along a C-C line in FIG. 12.

In FIG. 15, the peripheral portion of the magnetic sheet 11 and the peripheral portion of the magnetic sheet 12 around the space portion are inserted into the clearance 17 between the circuit board 8 and the FPC 16 to overlap with each other. Then, overlapped portions of the magnetic sheets 11, 12 are stuck together with the adhesive (not shown), or the like.

Figure 16:
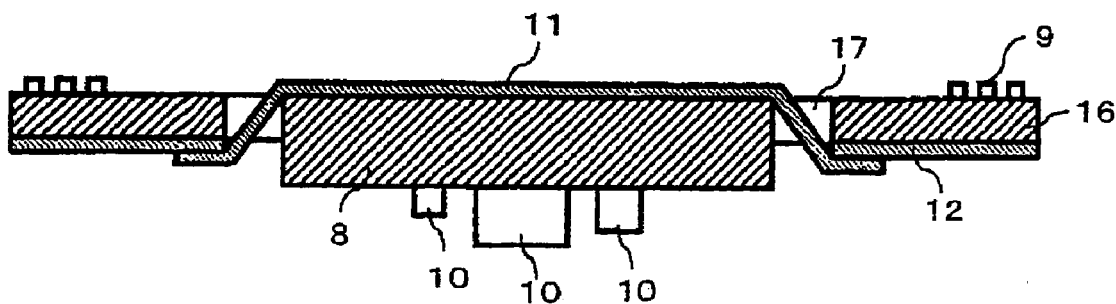
FIG. 16 is a partially notched sectional view of a variation of the non-contact communication antenna unit of Embodiment 3 of the present invention.
Figure 17:
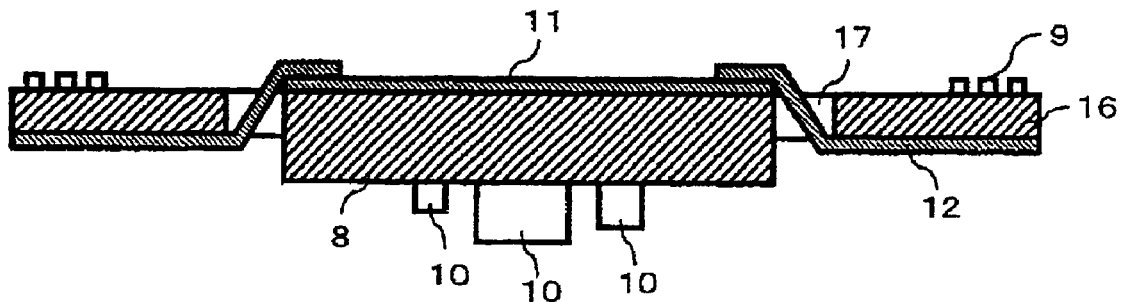
FIG. 17 is a partially notched sectional view of another variation of the non-contact communication antenna unit of Embodiment 3 of the present invention.

In above Embodiment 3, the case where the peripheral portions of the magnetic sheets 11, 12 are overlap mutually in the clearance 17 between the circuit board 8 and the FPC 16 and adhered together is explained as an example. But the present invention is not limited to this example. More particularly, as shown in FIG. 16, the peripheral portion of the magnetic sheet 11 may be inserted into the clearance 17 to pass through it, and then the peripheral portion of the magnetic sheet 11 and the inner peripheral portion of the magnetic sheet 12 around the space portion may be adhered together on the outside of the clearance 17. Also, as shown in FIG. 17, the peripheral portion of the magnetic sheet 12 around the space portion may be inserted into the clearance 17 to pass through it, and then the peripheral portion of the magnetic sheet 12 and the peripheral portion of the magnetic sheet 11 may be adhered together on the outside of the clearance 17.

As shown in FIG. 15, since the magnetic sheet 11 and the magnetic sheet 12 are arranged by using the clearance 17 between the circuit board 8 and the FPC 16 to overlap with each other, the antenna 9 and the electronic components 10 can be separated mutually. As a result, the influences of metal components such as the electronic components 10, electronic circuit wirings, the electronic circuit GND, etc., which are arranged on both surfaces of the circuit board 8 on the antenna 9 side and the opposite side, on the antenna 9 can be prevented, and thus a communication range of the antenna 9 can be ensured. Also, an attenuation of a magnetic field strength on the inner peripheral portion of the antenna 9 caused by the eddy current, which is generated in the metal shielding case on the cellular phone circuit board 4 arranged in the lower case 3, etc., can be prevented by using the magnetic sheet 12, and thus a communication range of the antenna 9 can be ensured.

As described above, according to the mobile communication device equipped with the non-contact communication antenna unit of Embodiment 3 of the present invention, the circuit board 8 is arranged in the space portion of the FPC 16 to provide the clearance 17 to the FPC 16, then the antenna 9 is arranged on the surface of the FPC 16, and then the electronic components 10 are arranged on the surface of the circuit board 8 on the opposite side of the FPC 16 on which the antenna 9 is arranged, whereby the antenna 9 and the electronic components 10 are separated by the magnetic sheet 11 and the magnetic sheet 12 by using the clearance 17. Therefore, a thickness reduction of the mobile communication device can be implemented and also a reduction in a communication range performance can be suppressed.

The present invention is explained in detail with reference to particular embodiments as above. But it is obvious for those skilled in the art that various variations and modifications can be applied without departing from a spirit and a scope of the present invention.

This application is based upon Japanese Patent Application (Patent Application No. 2005-223653) filed on Aug. 2, 2005; the contents of which are incorporated herein by reference.

INDUSTRIAL APPLICABILITY

As described above, the non-contact communication antenna unit and the mobile communication device equipped with the same according to the present invention possesses such advantages that a thickness reduction of a mobile communication device can be implemented and also a reduction in a communication range performance can be suppressed, and is useful to a cellular phone having a non-contact communication function, and the like.

The invention claimed is:

1. A non-contact communication antenna unit, comprising:
a non-contact communication circuit board;
a non-contact communication antenna arranged on one surface of the non-contact communication circuit board;
a non-contact communication electronic component arranged on another surface of the non-contact communication circuit board;
a first magnetic sheet arranged in a space portion of the non-contact communication antenna on one surface of the non-contact communication circuit board; and
a second magnetic sheet arranged on a peripheral portion of the non-contact communication electronic component on said another surface of the non-contact communication circuit board.

2. A non-contact communication antenna unit according to claim 1, wherein the non-contact communication circuit board has slits, and
the first magnetic sheet and the second magnetic sheet are arranged to cover the slits.

3. A non-contact communication antenna unit according to claim 2, wherein the second magnetic sheet has a space portion on an inside, and
at least one of a peripheral portion of the first magnetic and a peripheral portion of the space portion of the second magnetic sheet is inserted into the slits, and the peripheral portion of the first magnetic sheet and the peripheral portion of the second magnetic sheet are adhered together.

4. A mobile communication device having the non-contact communication antenna unit set forth in claim 1.

5. A mobile communication device according to claim 4, wherein the mobile communication device is a cellular phone.

6. A non-contact communication antenna unit, comprising:
a flexible circuit board having a space portion on an inside;
a non-contact communication circuit board arranged to have a clearance in the space portion of the flexible circuit board;
a non-contact communication antenna arranged on one surface of the flexible circuit board;
a first magnetic sheet arranged on one surface of the non-contact communication circuit board;
a non-contact communication electronic component arranged on other surface of the non-contact communication circuit board positioned on a same side as the other surface of the flexible circuit board; and
a second magnetic sheet having a space portion on an inside and arranged on the other surface of the flexible circuit board;
wherein at least one of a peripheral portion of the first magnetic sheet and a peripheral portion of the space portion of the second magnetic sheet is inserted into the clearance, and the peripheral portion of the first magnetic sheet and the peripheral portion of the second magnetic sheet are adhered together.

* * * * *